May 18, 1954     W. S. PRAEG     2,678,587
APPARATUS FOR SHAPER CUTTING GEARS
Filed April 18, 1949     3 Sheets-Sheet 1
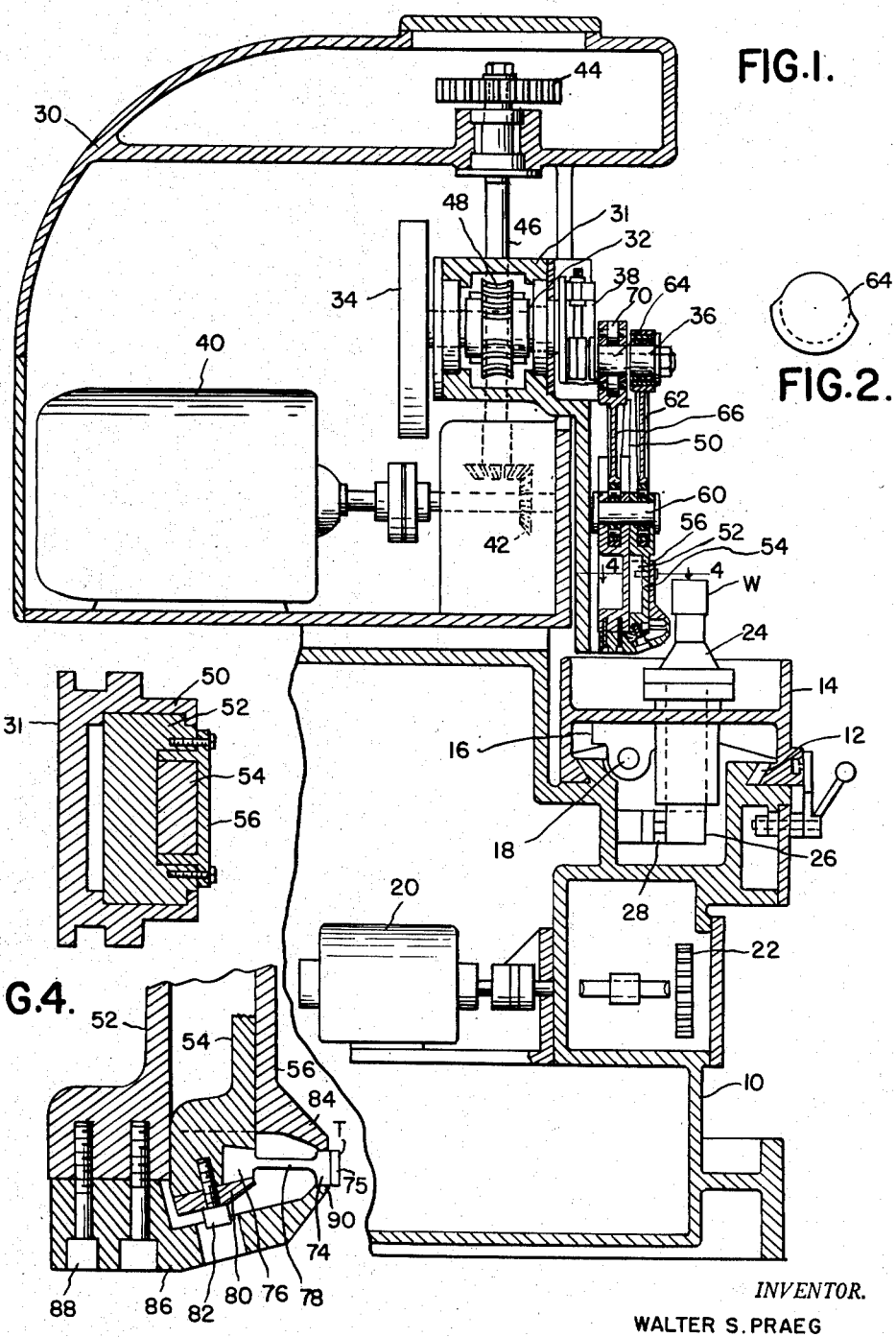
INVENTOR.
WALTER S. PRAEG
BY Whittemore,
Hulbert & Belknap
ATTORNEYS

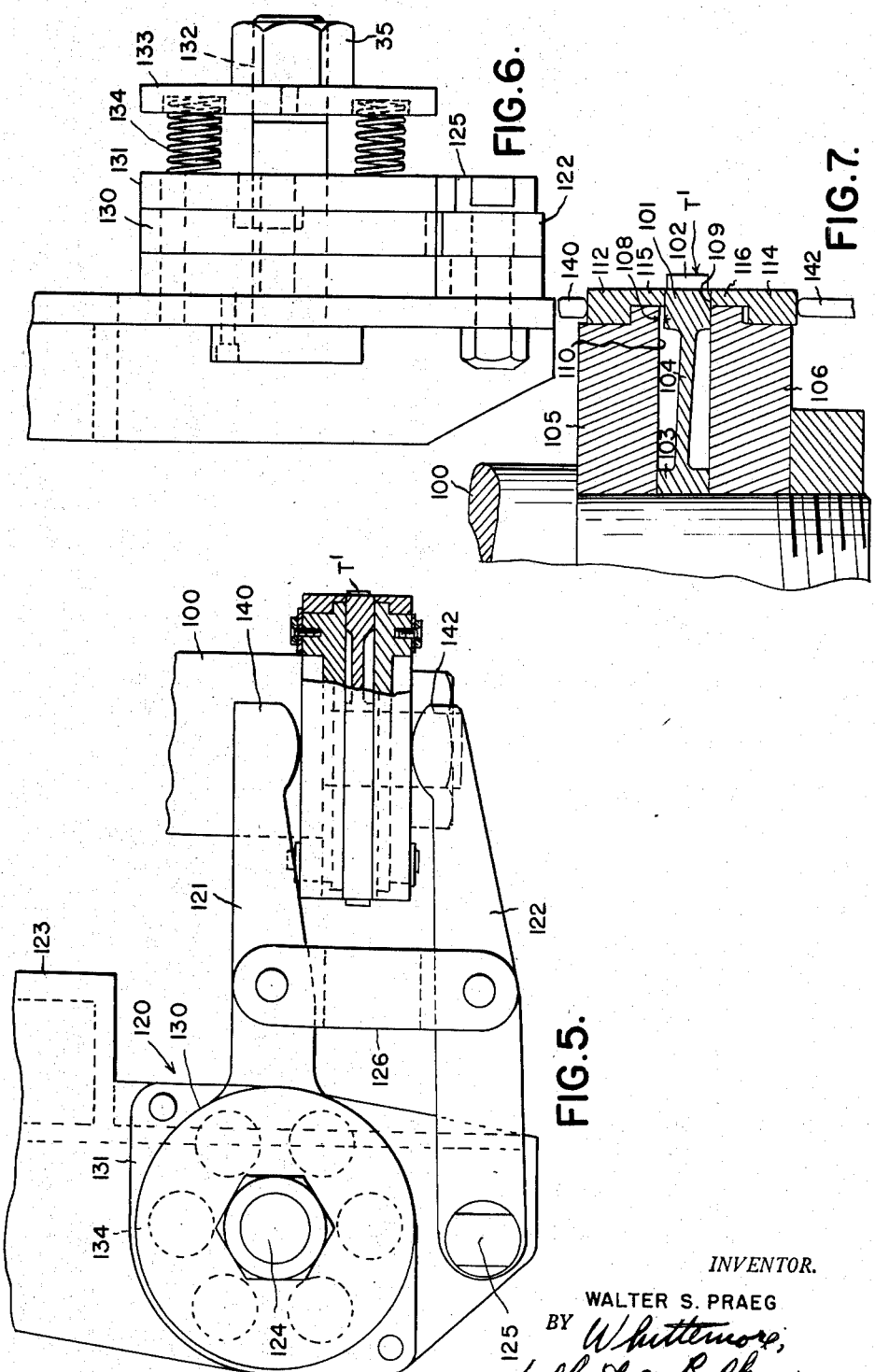

May 18, 1954
W. S. PRAEG
2,678,587
APPARATUS FOR SHAPER CUTTING GEARS
Filed April 18, 1949
3 Sheets-Sheet 3
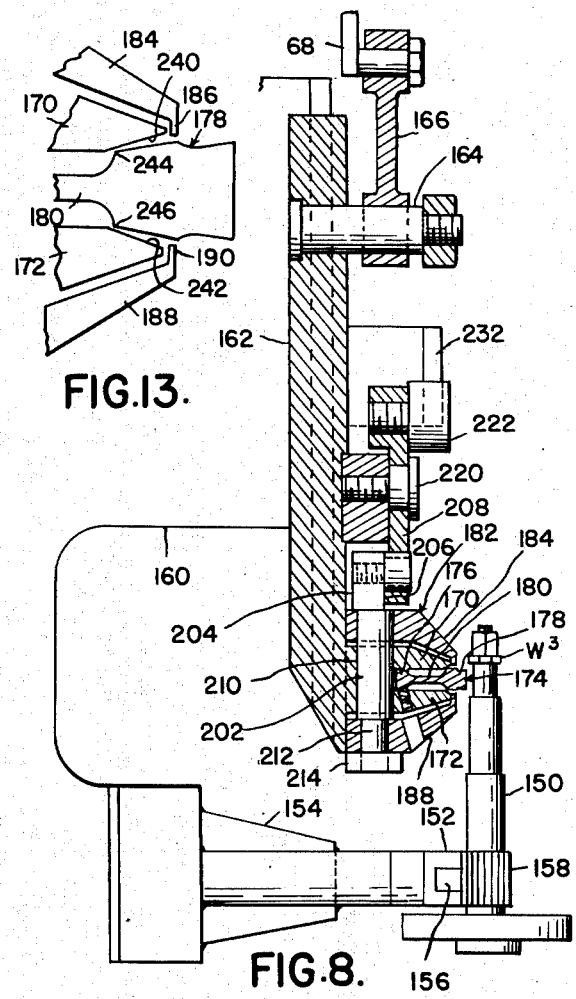
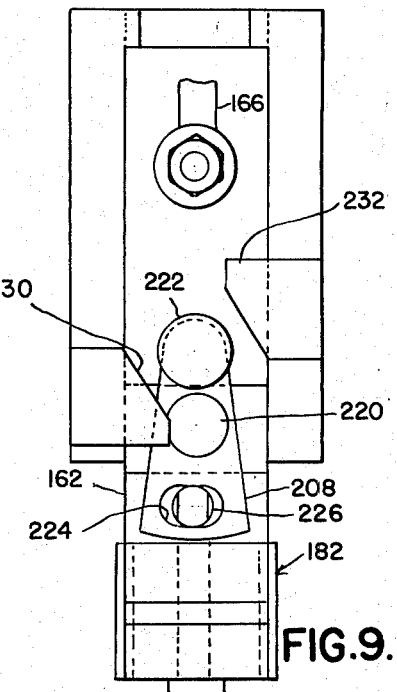
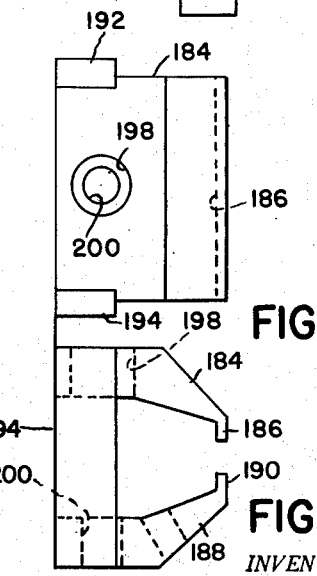
INVENTOR.
WALTER S. PRAEG
BY Whittemore,
Hulbert & Belknap
ATTORNEYS Patented May 18, 1954

2,678,587

UNITED STATES PATENT OFFICE 2,678,587

APPARATUS FOR SHAPER CUTTING GEARS

Walter S. Praeg, Detroit, Mich., assignor, by mesne assignments, to The Fellows Gear Shaper Company, Springfield, Vt., a corporation of Vermont Application April 18, 1949, Serial No. 88,176

16 Claims. (Cl. 90—8)

The present invention relates to apparatus for shaper cutting gears.

According to the present invention the gear is shaper cut with a toothed tool, the cutting portion of which is adapted to cut in both directions. In order to provide cutting clearance in back of the cutting edge, the teeth which are engaged in cutting are inclined slightly to the plane of the gear during the cutting stroke, in the direction which will produce cutting clearance in back of the cutting edge.

Conveniently, the foregoing is accomplished by providing a cutter having a rigid support portion, a rigid toothed cutting portion, and a flexible web interconnecting the support portion and the cutter portion. This tool may be in the form of a rack or it may be in the form of a circular cutter such as is shown in U. S. Patent No. 2,604,016 issued July 22, 1952. In the latter case the support portion comprises a central rigid hub, the cutter portion comprises a rigid annular rim having cutting teeth thereon, and the web comprises a relatively thin annular portion adapted to flex during operation of the tool.

During operation and in order to provide for a definite invariable amount of inclination of the cutting teeth during their cutting passage, rigid abutments are provided spaced at predetermined distance at each side of the rigid cutting portion of the tool.

As a cutting tooth is inclined from its neutral position to cutting position, the end of the tooth which is to effect the cutting operation moves outwardly of the tool toward the gear blank and the opposite end of the tooth moves inwardly of the tool away from the gear blank. The position of the cutting edge during the cutting stroke is therefore spaced toward the gear blank from its neutral position by a definite predetermined amount. Accordingly, in making very fine finishing strokes or in making the last few strokes in finishing a gear, a situation may result in which the tooth of the cutter will not engage the material of the gear blank so as to be flexed to cutting position, even though a small amount of excess material may remain on the gear blank.

According to the present invention this difficulty is overcome by preflexing the cutter so that the teeth which are to perform the cutting operation are inclined to proper cutting position prior to engagement with the work.

It is an object of the present invention to provide apparatus for shaper cutting gears in which the teeth of the shaper cutter are reversely inclined upon each cutting stroke prior to engagement with the work so as to provide cutting clearance in back of the cutting edge.

It is a further object of the present invention to provide mechanism operable automatically upon initiation of a cutting stroke to flex the cutter so as to incline the cutting teeth thereof prior to engagement with the work.

It is a further object of the present invention to provide apparatus for shaper cutting gears including a shaper cutting tool comprising a rigid support portion, a rigid cutting portion, and a flexible web interconnecting these portions, in conjunction with mechanism for preflexing the cutting teeth prior to engagement with the work.

Other objects and features of the invention will become apparent as the description proceeds, especially when taken in conjunction with the accompanying drawings, wherein:

Figure 1 is a vertical section through a machine designed for employing a rack type flexible shaper cutter.

Figure 2 is a diagrammatic view of a cam structure employed therein.

Figure 3 is an enlarged sectional view showing the tool flexing mechanism.

Figure 4 is an enlarged section on the line 4—4, Figure 1.

Figure 5 is a fragmentary side elevation partly in section showing mechanism for preflexing a rotary flexible cutter.

Figure 6 is a rear elevation of the structure shown in Figure 5.

Figure 7 is an enlarged sectional view through the flexible cutter and preflexing mechanism.

Figure 8 is a side view of another embodiment of the present invention with parts in section.

Figure 9 is a front elevation of the tool mechanism shown in Figure 8.

Figure 10 is a rear elevation of the tool flexing structure.

Figure 11 is a side elevation of the structure shown in Figure 10.

Figure 12 is a plan view of the structure shown in Figure 11.

Figure 13 is an enlarged fragmentary view illustrating the action between the toothed cutter bar, the flexing fingers, and the rigid abutments.

Referring now to Figure 1 there is illustrated a gear shaper machine comprising a main frame 10 having ways 12 extending horizontally across the front of the machine. Mounted for horizontal back and forth traverse on these ways is a work table 14 having a feed nut 16 carried thereby. The base of the frame 10 has mounted thereon a feed screw 18 adapted to be rotated by suitable mechanism which is fragmentarily indicated by the table feed motor 20 which is connected to the feed screw 18 by suitable gearing, one of the gears being indicated at 22. Mounted on the table 14 is a work supporting spindle 24 adapted to mount a gear blank W at its upper end. At its lower end the spindle 24 carries a master gear 26 which may be identical with the series of gears to be finished by the machine. Rigidly carried by the frame 10 and meshing with the master gear 26 is a master rack 28. It will be apparent that traverse of the table 14 will result in predetermined rotation of the work spindle 24 and hence of the gear blank W.

While the master gear and rack may be identical as to the tooth formation with the gear to be cut and the cutting rack, it will normally be desirable to employ relatively fine pitch parts for controlling the rotation of the gear. In this way a more accurate control of the gear being cut is obtained, since the number of teeth instantaneously in contact is increased. Moreover, this permits the use of a single master rack and a plurality of master gears, all of which are adapted to mesh with the single master rack.

A tool slide 30 is mounted on the upper portion of the base 10 for adjustment toward and away from the work spindle 24, this direction of adjustment being from right to left as seen in Figure 1. This adjustment is to accommodate gears of different diameter as will be readily apparent. Mounted for vertical adjustment on the slide is a tool drive mechanism 31 which includes a crank 32 provided with a flywheel 34 and having a crank pin 36 secured thereto. The crank pin 36 is radially adjustable on a plate 38 constituting a portion of the crank so as to provide for variation in stroke of the mechanism driven by the crank.

Located within the tool slide 30 is a motor 40 adapted to drive the crank in various positions of vertical adjustment through bevel gearing 42, change gearing 44, a worm 46, and worm gear 48.

At the front of the drive mechanism 31 is a forwardly projecting portion 50 providing vertical guide way for a first tool flexing slide 52. A tool slide 54 is also mounted for vertical reciprocation and is guided by a channel member 56 bolted to the tool flexing slide 52. The crank pin 36 is connected to a pin 60 carried at the upper end of the tool slide 54 by a connecting rod 62. At the inner end of the crank pin 36 is a cam surface 64 shown in detail in Figure 2. A connecting rod 66 is provided which connects the cam portion 64 of the crank pin to the tool flexing slide 52, and is provided at its upper end with a pair of opposed cam following rollers 70.

The cutting tool T, as best illustrated in Figure 3, comprises a rigid cutting portion 74 having teeth 75, a rigid supporting bar 76 and a flexible web 78 interconnecting portions 74 and 76. The support bar 76 is clamped at the lower end of the tool supporting slide 54 by a clamping strip 80 secured in place by a series of clamping screws 82. The forwardly extending portion 56 of the slide 52 has a downwardly and forwardly inclined flexing portion 84 adapted to engage the upper surface of the cutter bar 74. Secured to the lower portion of the slide 52 is a forwardly extending flexing plate 86 which is illustrated as fastened to the lower portion of the slide 52 by fastening screws 88. The extreme forward portion of the member 86 is shaped to provide an upwardly extending flexing portion 90 which engages the under side of the cutting bar 74.

The cam surface 64 is related to the eccentricity of the crank pin 36 such that upon initiation of a downward cutting stroke of the cutter slide 54, there is a relative upper motion of the cutter flexing slide 52. It will be appreciated that this relative motion may in fact be accomplished by so designing the cam that the cutter slide 54 initiates its downward movement prior to the downward movement of the cutter flexing slide 52. The relative motion between the slides 52 and 54 in the direction aforesaid will cause the cutter bar 74 to move upwardly with respect to the support bar 76, accompanied by a flexing of the web 78 and this will incline the cutting teeth 75 in the proper direction for cutting on a downward stroke.

Upon completion of the downward cutting stroke and sometime prior to engagement of the cutter with the work gear W on the upper cutting stroke, there is a second relative motion between the slides 52 and 54 in the opposite direction which will have the effect of moving the cutting bar 74 downwardly with respect to the support bar 76, thus inclining the cutting teeth 75 in the proper direction for cutting on the next stroke in the upward direction.

The flexing portions 84 and 90 of the cutter flexing slide may have slight clearance with respect to the upper and lower edges of the cutter bar 74, or if preferred they may be in firm guiding engagement therewith and the contacting surfaces appropriately shaped to permit the flexing motion to take place.

Referring now to Figures 5, 6 and 7, there is illustrated a cutter and cutter support adapted to operate on a conventional gear shaper employing a circular gear shaper cutter. In this case the cutter spindle 100 is mounted for reciprocation in a direction transverse to the plane of the gear and preferably, in a direction parallel to the axis of the gear. In the actual apparatus employed the cutter spindle 100 and the gear spindle will be geared together for rotation in timed relation as is well understood in the art. The flexible shaper cutter T' comprises a rim 101 having cutting teeth 102 thereon, the teeth being provided with cutting edges at both top and bottom ends. A rigid hub 103 is provided and a flexible web 104 interconnects the hub 103 and the rim 101. Mounted at the lower end of the cutter spindle are a pair of rigid abutments 105 and 106. The adjacent surfaces of the abutments are spaced apart a distance somewhat greater than the transverse width of the rim 101, this dimension being indicated at 108 in Figure 7. This dimension is selected so that when the rim 101 is in engagement with the surface 109 of the lower abutment 106, the cutting teeth 102 are inclined for cutting on the up stroke. Conversely, when the rim 101 is in contact with the lower surface 110 of the upper abutment, the teeth 102 are properly inclined for cutting on the down stroke.

Loosely mounted on the abutment members 105 and 106 are a pair of rings 112 and 114 having reduced portions 115 and 116 respectively for contacting with the upper and lower surfaces respectively of the rim 101.

Suitably mounted on a stationary part of the machine adjacent to the cutter support is a flexing device indicated generally at 120. This device comprises a pair of levers 121 and 122 pivotally mounted to a supporting bracket 123 at pivots 124 and 125 respectively. Levers 121 122 are interconnected by a link 126 so as to provide for parallel action of the levers.

The lever 121 has an enlarged circular friction portion 130 which is received below a friction plate 131. Mounted on the pivot bolt 132 is a spring seat 133 and intermediate the spring seat 133 and the friction plate 131 are a plurality of compression springs indicated at 134. The friction provided by this arrangement may be varied in an obvious manner by tightening the nut 135.

The forward end of the levers 121 and 122 have rounded contact portions 140 and 142 respectively. These portions are maintained at a constant spacing by the parallel action resulting from the use of the link 126. With the parts illustrated in the relation of Figure 6, the cutter is moving in an upward direction and such initial upward movement of the cutter spindle results in establishment of pressure between the upper contact portion 140 of the lever 121 and the upper ring 112. The upward motion of the lever 121 was opposed by friction with the result that the rim portion 101 of the cutter was moved downwardly until it abutted the upper surface 109 of the lower abutment 106. Thereafter, movement of the cutter spindle 100 takes place with the parts in the relation illustrated. Under these circumstances the cutting teeth 102 are properly inclined for cutting on the up stroke. As the next down stroke is commenced the cutter spindle moves downwardly establishing pressure between the lower ring 114 and the lower lever 122. Motion of the lever 122 is opposed by the frictional means so that the cutter is reversely flexed and the rim portion 101 engages the lower surface 110 of the upper abutment 105. After the cutter has been flexed further movement of the cutter is of course accomplished by corresponding movement of the levers 121 and 122 against the resistance imposed by the frictional device.

While the rim 101 of the circular cutter and the bar 74 of the rack type cutter have been defined as relatively rigid, these members may be capable of some flexing. It is essential however that these members have sufficient rigidity to retain the cutting teeth in properly related position so as to avoid the introduction of errors in the cut gears. However, in the case of the circular cutter it may be that the inclination of the cutting teeth in the cutting zone may not extend for a very great distance beyond the cutting zone, or in other words, the inclination of the teeth may result from a more or less local bending or twisting of the tooth supporting rim.

Since this is true it may be desirable in some cases to provide the rings 112 and 114 relatively loosely on the abutments 105 and 106 so that when pressure is applied through one of the rings to the rim 101, the rings may incline so that relative local twisting of the rim takes place.

Alternatively, it may be possible to omit the rings 112 and 114 and to so shape the flexing portions 140 and 142 of the levers 121 and 122 respectively, that they contact directly with the upper and lower surfaces respectively of the cutter rim 101. In any case, the flexing portions 140 and 142 are located at the cutting zone.

Referring now to Figures 8 through 13 there is illustrated yet another embodiment of the present invention. In this case the machine comprises a work spindle 150 which is mounted for rotation on a table (not shown), the table being movable in a direction perpendicular to the plane of the paper as seen in Figure 8. A master rack 152 is supported on a stationary part of the machine frame as by an extension 154 bolted or otherwise secured thereto. As indicated in Figure 8, the master rack 152 may have an intermediate adjustable section 156 in order to provide for a controlled elimination of backlash. Rigidly secured on the work spindle 150 is a master gear 158 adapted to mesh with the master rack and to produce a controlled generating rotation of the work spindle as it is traversed.

Mounted for vertical reciprocation on the frame 160 of the machine is a tool slide 162 having a driving pin 164 carried thereby and secured to a connecting rod 166 driven by suitable mechanism such for example as a crank indicated at 168.

Adjacent the lower portion of the tool slide is a forwardly extending portion including a rigid abutment 170 and detachably secured thereto is a second rigid abutment 172. A rack type shaper cutter 174 is provided and is clamped to the tool slide by the detachable abutment 172. The cutter 174 comprises a rigid support bar 176 which is firmly clamped in the tool slide as illustrated, a toothed cutter bar 178, and a flexible web 180 interconnecting the support bar 176 and the toothed cutter bar 178 so as to permit flexing.

Means are provided for flexing the cutter bar 178 prior to its engagement with a work piece W3, on a cutting stroke in either direction. This means takes the form of a flexing device indicated generally at 182 and shown in detail in Figures 10, 11 and 12. The flexing device comprises an upper flexing member 184 having a depending flexing finger 186, a lower flexing member 188 having an upper flexing finger 190. The flexing members 184 and 188 are connected together by side plates 192 and 194 which may be bolted or otherwise secured thereto as indicated generally at 196. The members 184 and 188 are each provided with openings 198 and 200 respectively for the reception of a pin 202 seen in Figure 8. The pin 202 has an enlarged head portion 204 which is cut away to provide a flat surface 206 for accommodating a cam adjusting member 208. The intermediate portion 210 of the pin is reduced and passes through the opening in the upper flexing member 184 and through a corresponding opening in the forwardly projecting portion of the tool slide 162. At its lower end the pin 202 is further reduced as indicated at 212, and passes through the opening 200 provided in the lower flexing member 188. The parts are assembled together with a clamping nut 214 illustrated in Figure 8.

The dimensions of the reduced intermediate portion 210 of the pin is such that a predetermined amount of clearance is provided between the lower surface of the upper flexing member 184 and the upper surface of the forwardly extending portion of the tool slide, and between the upper surface of the flexing member 188 and the lower surface of the forwardly projecting portion of the tool slide 162. The flexing fingers 186 and 190 extend longitudinally of the machine adjacent to the toothed bar 178 of the cutter, and are adapted to engage the same at a point spaced inwardly from the cutting teeth provided thereon.

Means are provided for effecting a vertical adjustment between the tool slide 162 and the flexing device 182. The cam 208 is mounted on the tool slide 162 for rocking movement about a pivot pin 220 and at its upper end it carries a cam engaging rolller 222. At its lower end the cam 208 has an inclined camming slot 224 in which is received a roller 226 secured to the flattened side of the enlarged head 204 of the pin 202. As the cam 208 is rocked about the axis of the pin 220, the inclined camming slot 224 will effect appropriate vertical movement of the camming device 182 relative to the tool slide 162. In order to effect controlled rocking of the cam 208, there are provided a pair of fixed cam blocks 230 and 232 in position to be engaged by the roller 222 as it approaches its lower or upper limit of reciprocation respectively. Cam blocks 230 and 232 are rigidly secured to the stationary part of the frame 160 and are preferably adjustable thereon to accommodate different vertical strokes of the cutter slide.

With the parts in the position illustrated in Figure 9, which is an intermediate position, a downward stroke will cause the roller 222 to engage the cam block 230 and will rock the cam 208 in a clockwise direction. This will have the effect of moving the flexing device 182 downwardly and will cause the flexing finger 186 to engage the upper surface of the toothed bar 178 of the rack and flex the same downwardly into engagement with the lower rigid abutment 172. This conditions the cutter for proper operation on the next cutting stroke, which is a cutting stroke in the upper direction. Flexing of the cutter to position the toothed bar 178 against the lower abutment 172 rocks the toothed bar in a direction to provide the necessary cutting clearance in back of the cutting edges provided at the top ends of the rack teeth. The cam 208 will remain in the position to which it was moved by engagement with the cam block 230. Upon completion of the upper cutting stroke, the roller 222 will engage the other fixed cam block 232 and will rock the cam 208 in a counterclockwise direction. This will result in raising the flexing device 182 relative to the tool slide and will cause the lower flexing finger 190 thereof to engage the toothed bar 178 and to move the same upwardly into engagement with the upper rigid abutment 170, thus conditioning the cutter for proper action on the next or downward cutting stroke.

In order to insure rocking motion of the toothed cutter bar 178 in the proper direction, the rigid abutments and the flexing fingers are designed in a particular manner to set up a torque on the cutter bar in the appropriate direction. This is illustrated in Figure 13 in which it will be observed that the rigid abutments 170 and 172 each are provided with inclined abutment surfaces 240 and 242 respectively. The top and bottom surfaces of the cutter bar 178 are inclined with respect to the abutment surfaces 240 and 242 and are adapted to engage therewith only by their corners 244 and 246 respectively. On the other hand, the flexing fingers 186 and 190 engage the cutter bar 178 at its forward edge directly adjacent to the roots of the cutting teeth. Accordingly, a flexing torque is set up which tends to rotate the toothed bar 178 in the proper direction. Thus for example, during the cutting stroke in the upper direction the flexing finger 186 will force the cutter bar 178 downwardly so that its corner 246 is in engagement with the inclined surface 242 of the lower abutment 172. The fact that the flexing finger 184 is located outwardly beyond the point of engagement of the corner 246 and the surface 242, sets up a torque tending to rotate the cutter bar in a clockwise direction which is appropriate for a cutting stroke in the upper direction.

The teeth which are instantaneously engaged in cutting are thereby given a proper inclination for cutting and this inclination takes place in the proper direction in a plane passing through the axis of the cutter (in the case of the circular cutter), and also passing through the cutting zone between the cutter and gear.

It will thus be apparent that mechanism is provided for initiating flexing a flexible gear shaper cutter so that it assumes proper cutting position prior to engagement with the work.

The drawings and the foregoing specification constitute a description of the improved method and apparatus for shaper cutting gears in such full, clear, concise and exact terms as to enable any person skilled in the art to practice the invention, the scope of which is indicated by the appended claims.

What I claim as my invention is:

1. A rack type gear cutting machine comprising a cutting tool having a rigid support bar, a rigid toothed bar, and a flexible web interconnecting said bars, said toothed bar having teeth provided with cutting edges at the end thereof, a tool support comprising a reciprocating slide rigidly engaging said support bar, a flexing member movable with said slide in reciprocation and movable relative thereto, said member having means thereon engaging opposite sides of said toothed bar, and means operable upon initiation of each stroke of reciprocation to effect relative movement between said slide and said member to flex said web to position the teeth of said toothed bar in clearance position.

2. A rack type gear cutting machine comprising a cutting tool having a rigid support bar, a rigid toothed bar, and a flexible web interconnecting said bars, said toothed bar having teeth provided with cutting edges at the end thereof, a tool support comprising a reciprocating slide rigidly engaging said support bar, a flexing member movable with said slide in reciprocation and movable relative thereto, said member having means thereon engaging opposite sides of said toothed bar, and cam means operable upon initiation of each stroke of reciprocation to effect relative movement between said slide and said member to flex said web to position the teeth of said toothed bar in clearance position.

3. A rack type gear cutting machine comprising a cutting tool having a rigid support bar, a rigid toothed bar, and a flexible web interconnecting said bars, said toothed bar having teeth provided with cutting edges at the end thereof, a tool support comprising a reciprocating slide rigidly engaging said support bar, a flexing member movable with said slide in reciprocation and movable relative thereto, said member having means thereon engaging opposite sides of said toothed bar, and a crank for reciprocating said slide and flexing member, independent connecting rods for connecting said crank to said slide and member, and cam means intermediate said crank and one of said connecting rods for effecting relative movement between said slide and member at the beginning of each reciprocation.

4. In a gear cutting machine, a reciprocating spindle, a cutting tool on said spindle comprising a rigid hub, a rigid toothed rim, and a flexible web intermediate said hub and rib, rigid annular abutments carried by said spindle and spaced slightly from the normal position of said rim and flexing members engageable with said rim inwardly of the teeth thereon and adjacent the cutting zone operable to flex said rim against one of said abutments upon initiation of a stroke of said spindle.

5. In a gear cutting machine, a reciprocating spindle, a cutting tool on said spindle comprising a rigid hub, a rigid toothed rim, and a flexible web intermediate said hub and rib, rigid annular abutments carried by said spindle and spaced slightly from the normal position of said rim and flexing members engageable with said rim adjacent the cutting zone operable to flex said rim against one of said abutments upon initiation of a stroke of said spindle, said flexing means comprising members movable with said cutter and brake means opposing such movement in both directions.

6. In a gear cutting machine, a reciprocating spindle, a cutting tool on said spindle comprising a rigid hub, a rigid toothed rim, and a flexible web intermediate said hub and rib, rigid annular abutments carried by said spindle and spaced slightly from the normal position of said rim and flexing members engageable with said rim adjacent the cutting zone operable to flex said rim against one of said abutments upon initiation of a stroke of said spindle, said flexing means comprising parallel levers having end portions movable with said cutter and brake means opposing such movement in both directions.

7. In a gear shaping machine, a rack type gear cutter comprising a rigid support bar, a rigid toothed bar having teeth provided with cutting edges at both ends thereof, and a flexible web interconnecting said rigid bars; rigid abutment bars normally spaced transversely from said toothed bar, said abutment bars and toothed bar being shaped to abut at the edge of said toothed bar opposite to its teeth; and flexing fingers movable relative to said abutment bars to flex said toothed bar against one or the other of said abutment bars, said flexing fingers being shaped to engage said toothed bar at points spaced forwardly toward the toothed edge from the points of engagement of the abutment bars to set up a torque tending to rotate the toothed bar in the proper direction for the succeeding cutting stroke.

8. A gear shaper comprising a work support, a tool holder, means for effecting relative reciprocation between said work support and tool holder, said tool holder being designed for use with a tool having a rigid support portion, a toothed cutting portion, and a flexible web interconnecting said support and cutting portions, said tool holder having means for rigidly gripping the support portion of said cutter, and a pair of members for gripping the toothed cutting portion of the tool inwardly of the teeth thereof and holding the cutting portion throughout the cutting stroke in position to flex the web of said tool and present the cutting teeth to the work with clearance in back of the cutting edges.

9. Apparatus as defined in claim 8 in which said members comprise a pair of rigid abutments mounted on said holder for movement relative to said means for gripping the support portion, and means operable before cutting during a cutting stroke to shift said members in a direction opposite to that of said stroke.

10. Apparatus as defined in claim 8 in which one of said members comprises one of a pair of rigid abutments fixed on said holder at opposite sides of said cutting portion, and the other of said members comprises one of a pair of preflexing elements movable as a unit on said holder and means operable before cutting during each cutting stroke to shift said elements in an opposite direction to position the cutting portion against one of said rigid abutments.

11. Apparatus as defined in claim 10 comprising an actuator movable between two positions to effect movement of said elements and cam means operable upon completion of each stroke for moving said actuator to position said elements properly for the next succeeding stroke.

12. Apparatus as defined in claim 11, said actuator comprising a pivoted lever, and a pin and slot connection between said lever and said elements, the inclination of the slot to the relative movement between the pin and slot making a small angle to insure against movement of said lever except when cammed to one of its two positions.

13. A gear shaper machine comprising a work support, a tool holder, a tool comprising a rigid support portion, a toothed cutter portion, and a flexible web interconnecting said support and cutter portions, the teeth of said tool having cutting edges at both ends thereof, rigid abutments on said holder spaced at opposite sides of said toothed cutter portion shaped to engage said cutter portion inwardly of the teeth thereon to limit flexing thereof, and to provide a firm support for the cutting teeth closely adjacent thereto, preflexing means comprising a pair of elements spaced at opposite sides of said toothed cutter portion and engageable therewith inwardly of the teeth thereon, means for effecting relative reciprocation between said holder and said work support, and mechanism automatically operable in timed relation to each stroke of relative reciprocation to cause the element at the side of said toothed portion toward said work support to press said toothed cutting portion into engagement with the opposite rigid abutment prior to engagement with a work piece.

14. Apparatus as defined in claim 13 in which said preflexing means comprises a slide on said tool holder movable thereon in a direction perpendicular to the plane of the tool.

15. A gear shaper comprising a work support, a tool holder, means for effecting relative reciprocation between said work support and said tool holder, a cutter mounted in said tool holder, said cutter having an elongated base portion of substantial length rigidly fixed in said tool holder, an elongated tooth carrying rib portion spaced from said base portion, a multiplicity of spaced cutting teeth carried by said carrying rib portion, a flexible resilient web portion formed to extend substantially coextensively with said base and rib portions and joining said portions, and preflexing means engaging said tool inwardly of the teeth thereof and to hold the cutting portion throughout the cutting stroke in a position to flex the web of said tool and present the cutting teeth to the work with clearance in back of the cutting edges.

16. A gear shaper comprising a work support, a tool holder, means for effecting relative reciprocation between said work support and said tool holder, a cutter mounted in said tool holder, said cutter having an elongated base portion of substantial length rigidly fixed in said tool holder, an elongated tooth carrying rib portion spaced from said base portion, a multiplicity of spaced cutting teeth carried by said carrying rib portion, a flexible resilient web portion formed to extend substantially coextensively with said base and rib portions and joining said portions, preflexing means engaging said tool inwardly of the teeth thereof and to hold the cutting portion throughout the cutting stroke in a position to flex the web of said tool and present the cutting teeth to the work with clearance in back of the cutting edges, and means operable in timed relation to the reciprocation between tool and work to actuate said preflexing means.

References Cited in the file of this patent

UNITED STATES PATENTS

| Number | Name | Date |
|---|---|---|
| 1,041,984 | Eggers | Oct. 22, 1912 |
| 2,386,572 | Pigott | Oct. 9, 1945 |
| 2,432,020 | Laesser | Dec. 2, 1947 |

FOREIGN PATENTS

| Number | Country | Date |
|---|---|---|
| 829,870 | France | Apr. 25, 1938 |